United States Patent
Heitzer

(10) Patent No.: US 7,185,576 B2
(45) Date of Patent: Mar. 6, 2007

(54) HYDRAULIC SERVO-STEERING VALVE WITH STEERING MOMENT SUPERIMPOSITION

(75) Inventor: Heinz-Dieter Heitzer, Heinsberg (DE)

(73) Assignee: TRW Automotive GmbH (DE)

( * ) Notice: Subject to any disclaimer, the term of this patent is extended or adjusted under 35 U.S.C. 154(b) by 30 days.

(21) Appl. No.: 11/111,684

(22) Filed: Apr. 21, 2005

(65) Prior Publication Data

US 2005/0241474 A1    Nov. 3, 2005

(30) Foreign Application Priority Data

Apr. 21, 2004 (DE) ............... 20 2004 006 294 U

(51) Int. Cl.
*B62D 5/20* (2006.01)
*F15B 9/10* (2006.01)
*B62D 5/083* (2006.01)

(52) U.S. Cl. ................. 91/375 A; 74/388 PS; 180/421

(58) Field of Classification Search ........ 74/388 PS; 91/375 A; 180/421, 422
See application file for complete search history.

(56) References Cited

U.S. PATENT DOCUMENTS

| | | | |
|---|---|---|---|
| 4,774,847 A | | 10/1988 | Breitweg |
| 4,871,040 A | * | 10/1989 | Zuraski et al. ............ 180/422 |
| 5,511,630 A | * | 4/1996 | Kohata et al. ............ 180/422 |
| 5,842,538 A | * | 12/1998 | Sangret .................... 91/375 A |
| 6,062,123 A | * | 5/2000 | Obata et al. ............. 91/375 A |
| 6,234,271 B1 | * | 5/2001 | Suzuki et al. ............ 91/375 A |
| 2005/0067594 A1 | | 3/2005 | Pfeifer |
| 2005/0092948 A1 | | 5/2005 | Heitzer |

FOREIGN PATENT DOCUMENTS

| | | |
|---|---|---|
| DE | 36 34 216 | 4/1987 |
| DE | 42 34 571 | 4/1994 |
| DE | 102 53 465 | 1/2004 |
| DE | 203 14 723 | 3/2004 |
| DE | 203 16 602 | 4/2004 |
| EP | 1 384 652 | 1/2004 |

OTHER PUBLICATIONS

Document Bibliography and Abstract for DE 36 34 216 from http://v3.espacenet.com/textdoc?DB=EPODOC&IDX=DE3634216&F=0, printed Jul. 14, 2005.
Document Bibliography and Abstract for DE 203 14 723 from http://v3.espacenet.com/textdoc?DB=EPODOC&IDX=DE20314723U&F=0, printed Jul. 14, 2005.
Document Bibliography and Abstract for DE 203 16 602 from http://v3.espacenet.com/textdoc?DB=EPODOC&IDX=DE20316602U&F=0, printed Jul. 14, 2005.

* cited by examiner

*Primary Examiner*—Thomas E. Lazo
(74) *Attorney, Agent, or Firm*—MacMillan, Sobanski & Todd, LLC

(57) ABSTRACT

A servo-steering valve for a hydraulic servo-steering arrangement has an input shaft, an output shaft, a torsion rod which biases the input shaft and the output shaft relative to each other into a central position, and a valve which consists of a valve sleeve and a valve shaft which with a rotation of the input shaft relative to the output shaft are rotated relative to each other. An adjustment drive is provided, which can rotate one component of the servo-steering valve with respect to another, so that a superimposition value is superimposed on an input value which is given through the actuation of the input shaft.

25 Claims, 5 Drawing Sheets

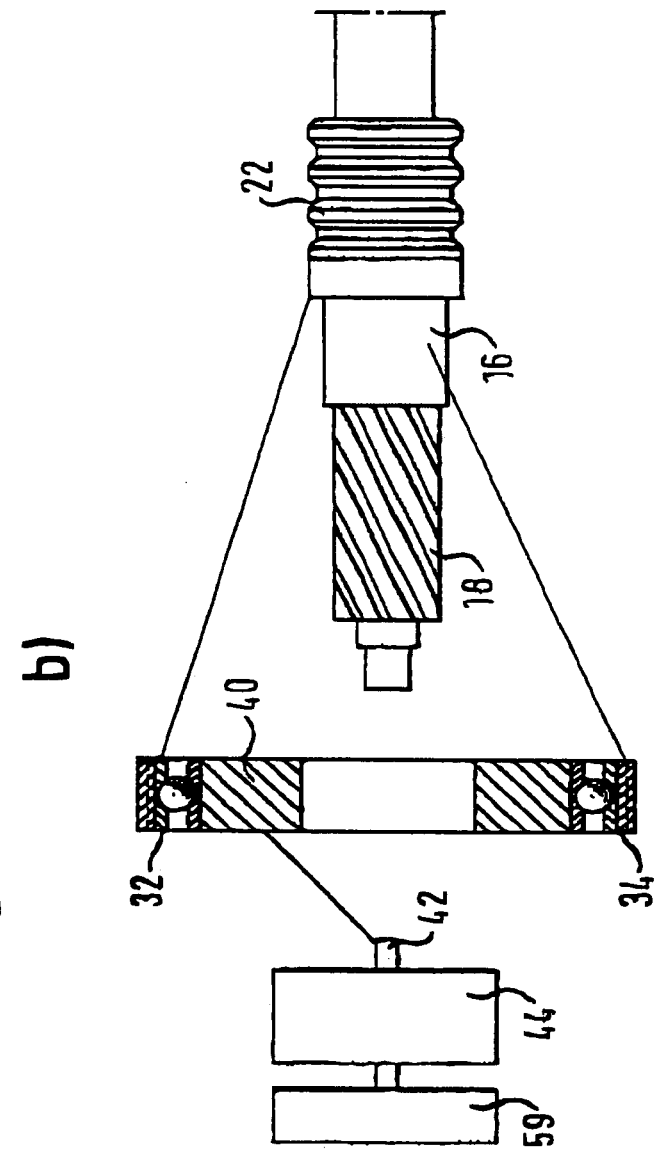
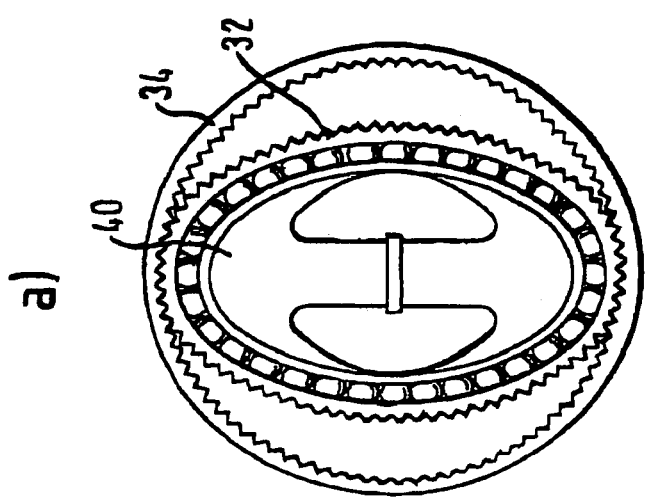
Fig. 5

HYDRAULIC SERVO-STEERING VALVE WITH STEERING MOMENT SUPERIMPOSITION

CROSS REFERENCE TO RELATED APPLICATION

This application claims priority to German Application No. 20 2004 006 294.1 filed Apr. 21, 2004, the disclosures of which are incorporated herein by reference.

BACKGROUND OF THE INVENTION

The invention relates to a servo-steering valve for a hydraulic servo-steering arrangement, with an input shaft an output shaft, a torsion rod which acts upon the input shaft and the output shaft relative to each other into a central position, and with a valve which consists of a valve sleeve and a valve shaft which are turned relative to each other upon a rotation of the input shaft relative to the output shaft.

Such a servo-steering valve is generally known. The rotation of the valve sleeve relative to the valve shaft results in a hydraulic flow being provided in one or other direction as a function of the direction of rotation. This hydraulic flow is converted in a hydraulic cylinder into a steering support force. The extent of the steering support force depends here on the steering moment which is applied by the driver via the steering wheel onto the input shaft.

In modern steering systems, it is desirable that the steering process can be influenced from the exterior. In other words, the hitherto single input value of the servo-steering valve, namely the steering moment executed by the driver, is to be superimposed with a superimposition value, which leads to a modification of the steering command. In this way, for example, systems for automatic vehicle stabilization can act on the driving behaviour of the vehicle. Finally, the steering characteristic of the steering system (the steering "feel"), of which the driver is aware via the steering wheel, can be altered.

BRIEF SUMMARY OF THE INVENTION

An aspect of the invention consists in further developing a servo-steering valve of the type initially mentioned to the effect that a superimposition value can be superimposed on an input value given by the driver.

To solve this problem, in accordance with the invention an adjustment drive is provided, which can rotate one component of the servo-steering valve with respect to another so that a superimposition value is superimposed on an input value which is given by the actuation of the input shaft. The invention is based on the fundamental idea of acting directly on the components of the hydraulic valve, which are ultimately responsible for the amount and direction of the hydraulic flow, rather than using superimposition gears known from the prior art. In particular, the valve housing can be turned relative to the output shaft or the end of the torsion rod associated with the input shaft can be turned relative to the input shaft. For the adjustment drive, in particular a strain wave gear ("Harmonic Drive") is suitable, which brings about the necessary rotation of the components relative to each other. The strain wave gear is distinguished by a small space requirement with, at the same time, a very high reduction factor.

Other advantages of this invention will become apparent to those skilled in the art from the following detailed description of the preferred embodiment, when read in light of the accompanying drawings.

BRIEF DESCRIPTION OF THE DRAWINGS

FIGS. 5a and 5b show diagrammatically the adjustment drive for a servo-steering valve according to a second embodiment of the invention.

DETAILED DESCRIPTION OF THE INVENTION

Figure 1:
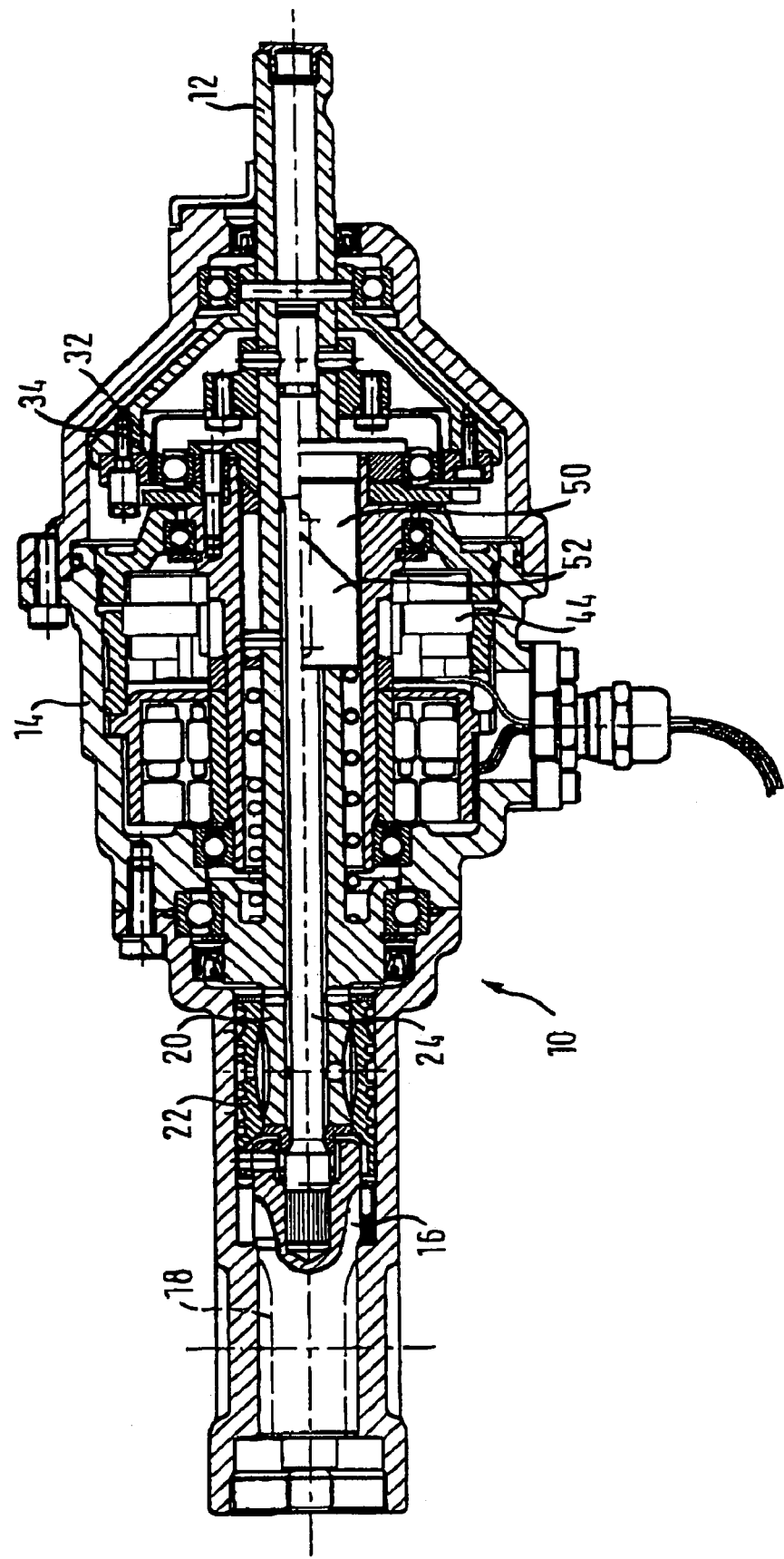
FIG. 1 shows diagrammatically a section through a servo-steering valve according to a first embodiment.
Figure 2:
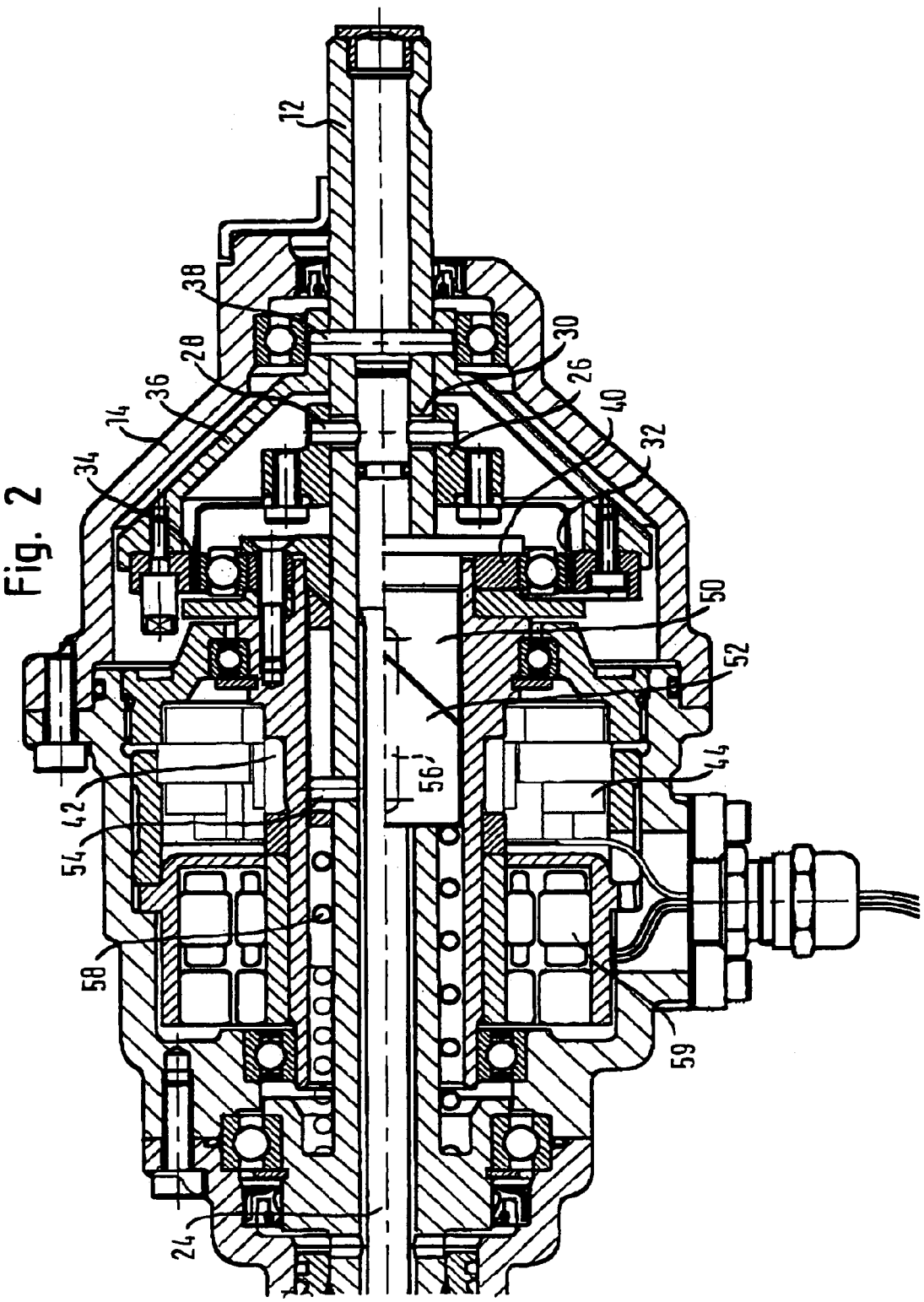
FIG. 2 shows on an enlarged scale the section of the servo-steering valve of FIG. 1 provided with the adjustment drive.

In FIG. 1 a servo-steering valve 10 is shown diagrammatically, which has an input shaft 12, a housing 14 and an output shaft 16. The input shaft is coupled with a steering wheel (not illustrated). The output shaft is provided with teeth 18 which cooperate with a tooth rack (not illustrated), which in turn is connected with steerable vehicle wheels via tie rods. The output of the output shaft 16 can of course also take place in a different manner.

The input shaft 12 is constructed at its left-hand end, with respect to FIG. 1, as a valve shaft 20, which is arranged inside a valve sleeve 22. The valve shaft 20 together with the valve sleeve 22 forms a valve, known per se, which controls a hydraulic flow by rotation of the valve shaft relative to the valve sleeve. The valve sleeve 22 is connected with the output shaft 16 so as to be secure with regard to rotation. Between the input shaft 12 and the output shaft 16, a torsion rod 24 is arranged, which acts upon the input shaft and the output shaft relative to each other into a central position. The maximum possible rotation of the input shaft relative to the output shaft is defined by mechanical stops.

The mode of operation of the servo-steering valve described hitherto is generally known from the prior art.

Figure 3:
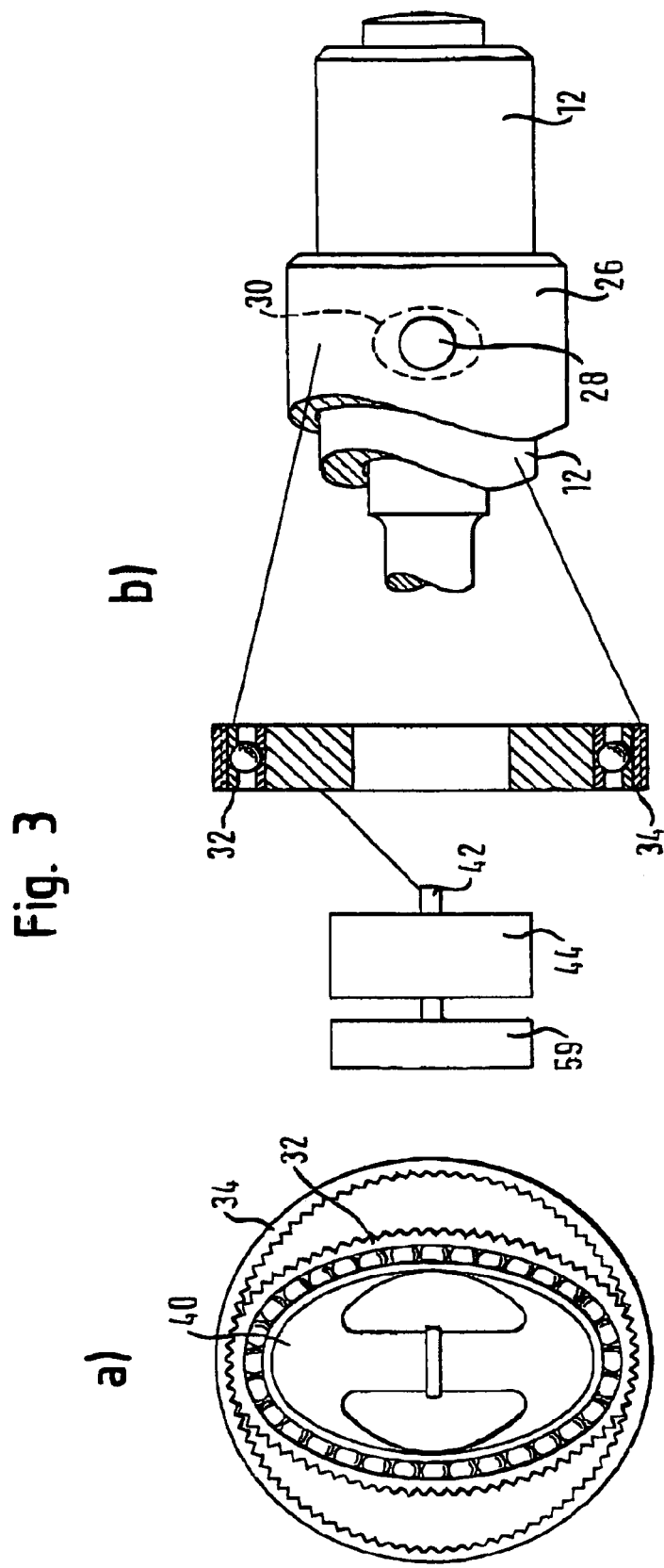
FIGS. 3a and 3b show in diagrammatic views the development and arrangement of the adjustment drive.

To modify the input value given by the actuation of the input shaft 12, in accordance with the invention the end of the torsion rod 24 associated with the input shaft 12 (hereinafter named the "first end") is not connected non-rotatable with the input shaft 12, but rather can be rotated in a controlled manner relative thereto. For this purpose, an adjustment sleeve 26 is provided, which is rotatably arranged on the input shaft 12. In the adjustment sleeve 26, a pin 28 is held securely, which is also held securely in the first end of the torsion rod 24. The input shaft 12, on the other hand, is provided in the region of the pin 28 with two openings 30 (see also FIG. 3b) which extend in peripheral direction over an angle range which is greater than the angle range occupied by the pin 28. In other words, the opening 30 makes it possible that the pin 28 (and hence the first end of the torsion rod 24), starting from a central position, is turned in both directions relative to the input shaft 12.

The adjustment sleeve 26 is connected with a flexible inner ring 32 of a strain wave gear (also known under the name of "Harmonic-Drive"). The flexible inner ring 32 is provided on its outer side with teeth which mesh with teeth which are formed on the inner side of an outer ring 34. The outer ring 34 of the strain wave gear is connected with the input shaft 12 so as to be secure with regard to rotation via a socket 36 and a connecting pin 38. Inside the flexible inner ring 32, a drive disc 40 of the strain wave gear is arranged, which is connected with a rotor 42 of a drive motor 44 of the adjustment drive. The drive motor 44 is a brushless direct current motor. Its stator is supported on the housing 14.

The drive motor 44 is equipped with a sensor 59 which provides a control unit with information about the current position of the rotor 42 of the drive motor 44. In addition, a steering angle sensor (not illustrated) is provided, which detects the position of the input shaft.

By actuation of the drive motor 44, the first end of the torsion rod 24 can be turned relative to the input shaft 12 via the strain wave gear. In this way, a superimposition value is superimposed on the input value given via the input shaft. This can serve in particular to alter the steering moment felt by the driver, without the input shaft 16 being rotated here.

If, with the servo-steering gear described hitherto, a disturbance occurs on the adjustment drive, this does not lead to a failure of the servo-steering gear but merely to a faulty adjustment. If, for example, the drive motor 44 fails when the first end of the torsion rod 24 is turned to a maximum extent relative to the input shaft 12, this leads to the valve sleeve being turned relative to the valve shaft when the steering valve assumes the theoretically correct central position. The servo-steering gear as such is, however, still capable of functioning.

Figure 4:
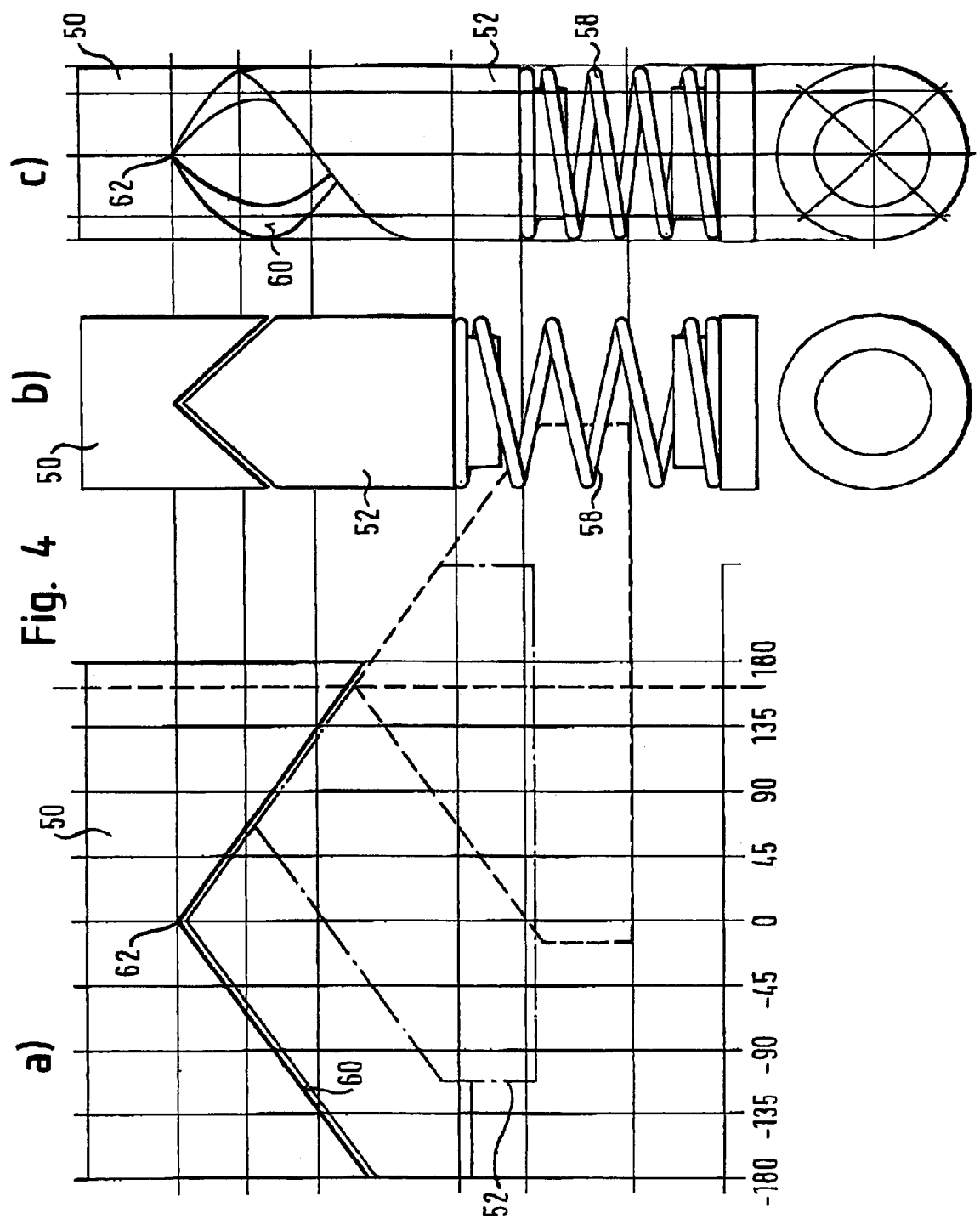
FIGS. 4a and 4b show details of the centering arrangement used in the servo-steering valve of FIG. 1.

To improve the security from failure, a centering arrangement is provided (see also FIG. 4), which has a support element 50 which is connected with the input shaft 12 so as to be secure with regard to rotation, and also a centering element 52 which is arranged on the rotor 42 of the drive motor 44 of the adjustment drive so as to be secure with regard to rotation via a pin 54 and a groove 56, but so as to be axially displaceable. The centering element 52 is acted upon by a spring 58 against the support element 50.

The support element 50 has a curve surface 60 which has approximately the form of a section obliquely to the central axis through the support element 50. In other words, the curve surface 60 has a "lowest" point 62, starting from which the curve surface "rises" in each peripheral direction. The "highest" point of the curve surface is therefore situated turned through 180 degrees with respect to the "lowest" point.

The centering element 52 is constructed complementary to the curve surface 60 of the support element 50, It follows from this that the centering element 52 is acted upon by the spring 58 into a central position in which the "highest" point of the curve surface of the centering element 52 lies at the "lowest" point 62 of the curve surface 60 of the support element 50 (see FIG. 4b). Starting from this central position, the centering element 52 can be turned in each direction relative to the support element 50, and namely through 180 degrees theoretically. In practice, the maximum possible adjustment range is limited to a slightly smaller angle range (See FIG. 4a). With a rotation of the centering element 52 relative to the support element 50, the spring 58 is pre-stressed. The result of this is a restoring moment into the central position. This restoring moment is sufficiently great in order to act upon the rotor 42 of the drive motor 44 into its central position, when a disturbance in the controlling of the drive motor occurs. The servo-steering valve would then automatically be restored into its correct central position, so that no impairment of the operation would be able to be detected at all.

The reduction ratio of the strain wave gear is selected so that for the production of the maximum rotation of the first end of the torsion rod 24 relative to the input shaft 12 in one or other direction respectively a rotation of the rotor 42 of the drive motor of slightly less than 180 degrees is necessary. This necessity results from the development of the centering arrangement consisting of the support element 50 and the centering element 52. Owing to the high reduction ratios which are possible with strain wave gears with only one stage, this requirement can be achieved in practice without difficulty.

In FIG. 5 a second embodiment is shown diagrammatically. This differs from the first embodiment in that the strain wave gear brings about a rotation of the valve sleeve 22 relative to the output shaft 16. For this purpose, the outer ring 34 is coupled with the output shaft 16, and the flexible inner ring 32 is coupled with the valve sleeve 22. This embodiment makes it possible in particular to influence the servo-assistance provided by the hydraulic valve.

In the second embodiment, instead of the angle position of the input shaft the angle position of the output shaft 16 is detected and evaluated by a control unit together with the information about the position of the rotor 42 provided by the sensor 60.

According to a variant embodiment which is not illustrated, the stator of the drive motor can not be supported on the housing, but rather on the input shaft or on the output shaft. In this case, the drive motor would have to be connected electrically via a flat band cable which is wound in a spiral shape.

In accordance with the provisions of the patent statutes, the principle and mode of operation of this invention have been explained and illustrated in its disclosed embodiments. However, it must be understood that this invention may be practiced otherwise than as specifically explained and illustrated without departing from its spirit or scope.

What is claimed is:

1. A servo-steering valve for a hydraulic servo-steering arrangement, with an input shaft, an output shaft, a torsion rod which biases said input shaft and said output shaft relative to each other into a central position, and with a valve which consists of a valve sleeve and a valve shaft, which with a rotation of said input shaft relative to said output shaft are rotated relative to each other, wherein an adjustment drive is provided which can rotate one of said valve sleeve and said valve shaft with respect to the other so that a superimposition value is superimposed on an input value which is given through actuation of said input shaft, and wherein said adjustment drive can rotate a first end of said torsion rod, associated with said input shaft, relative to said input shaft.

2. The servo-steering valve according to claim 1, wherein said input shaft is coupled with said valve shaft, and said output shaft is coupled with said valve sleeve.

3. The servo-steering valve according to claim 1, wherein an adjustment sleeve is provided which is connected non-rotatably with said first end of said torsion rod.

4. The servo-steering valve according to claim 3, wherein said first end of the torsion rod is connected non-rotatably to said adjustment sleeve by a pin.

5. The servo-steering valve according to claim 4, wherein said pin projects through openings in said input shaft, the dimensions of which are greater in peripheral direction than an extent of the pin, so that said openings delimit rotation of said adjustment sleeve and hence of said first end of said torsion rod relative to said input shaft.

6. The servo-steering valve according to claim 3, wherein said adjustment sleeve is held on said input shaft.

7. The servo-steering valve according to claim 3, wherein said inner ring is connected with said adjustment sleeve.

8. A servo-steering valve for a hydraulic servo-steering arrangement, with an input shaft, an output shaft, a torsion rod which biases said input shaft and said output shaft relative to each other into a central position, and with a valve which consists of a valve sleeve and a valve shaft, which with a rotation of said input shaft relative to said output shaft are rotated relative to each other, wherein an adjustment drive is provided which can rotate one of said valve sleeve and said valve shaft with respect to the other so that a superimposition value is superimposed on an input value which is given through actuation of said input shaft, and wherein said adjustment drive has a strain wave gear with an outer ring, a flexible inner ring and a drive disc.

9. The servo-steering valve according to claim 8, wherein said outer ring is connected with said input shaft.

10. The servo-steering valve according to claim 8, wherein said adjustment drive can rotate said output shaft relative to said valve sleeve, said valve shaft being coupled with said input shaft.

11. The servo-steering valve according to claim 10, wherein said outer ring is connected with said output shaft.

12. The servo-steering valve according to claim 10, wherein said inner ring is connected with said valve sleeve.

13. The servo-steering valve according to claim 8, wherein said adjustment drive has a drive motor.

14. The servo-steering valve according to claim 13, wherein said drive motor is a brushless direct current motor.

15. The servo-steering valve according to claim 13, wherein said drive motor has a stator which is supported on said housing of said servo-steering valve.

16. The servo-steering valve according to claim 13, wherein said drive motor has a stator which is supported on said input shaft.

17. The servo-steering valve according to claim 13, wherein said drive motor has a rotor which is connected with said drive disc of said strain wave gear.

18. The servo-steering valve according to claim 17, wherein a centering arrangement is provided which biases said rotor of the drive motor into a central position.

19. The servo-steering valve according to claim 18, wherein said centering arrangement has a centering element which is biased by a spring against a curve surface.

20. The servo-steering valve according to claim 19, wherein said curve surface has a low point which is associated with a central position of the rotor of said drive motor, from which, in each peripheral direction, a higher level can be reached.

21. The servo-steering valve according to claim 19, wherein said centering element is a sleeve.

22. The servo-steering valve according to claim 19, wherein said centering element is coupled non-rotatably but axially displaceably with said rotor.

23. The servo-steering valve according to claim 8, wherein a steering angle sensor is provided which detects a position of said input shaft.

24. A servo-steering valve for a hydraulic servo-steering arrangement, with an input shaft, an output shaft, a torsion rod which biases said input shaft and said output shaft relative to each other into a central position, and with a valve which consists of a valve sleeve and a valve shaft, which with a rotation of said input shaft relative to said output shaft are rotated relative to each other, wherein an adjustment drive is provided which can rotate one of said valve sleeve and said valve shaft with respect to the other so that a superimposition value is superimposed on an input value which is given through actuation of said input shaft and wherein a sensor is provided, which detects a position of said rotor of said drive motor.

25. A servo-steering valve for a hydraulic servo-steering arrangement, with an input shaft, an output shaft, a torsion rod which biases said input shaft and said output shaft relative to each other into a central position, and with a valve which consists of a valve sleeve and a valve shaft, which with a rotation of said input shaft relative to said output shaft are rotated relative to each other, wherein an adjustment drive is provided which can rotate one of said valve sleeve and said valve shaft with respect to the other so that a superimposition value is superimposed on an input value which is given through actuation of said input shaft, and wherein a steering angle sensor is provided which detects a position of said output shaft.

* * * * *